No. 784,659. PATENTED MAR. 14, 1905.
N. A. BUTLER.
FERTILIZER DISTRIBUTER.
APPLICATION FILED JAN. 23, 1905.

WITNESSES:

INVENTOR
N. A. Butler,
By Franklin H. Hough
Attorney

No. 784,659. Patented March 14, 1905.

UNITED STATES PATENT OFFICE.

NEAL AVERY BUTLER, OF HAMPTON, VIRGINIA.

FERTILIZER-DISTRIBUTER.

SPECIFICATION forming part of Letters Patent No. 784,659, dated March 14, 1905.

Application filed January 23, 1905. Serial No. 242,362.

*To all whom it may concern:*

Be it known that I, NEAL AVERY BUTLER, a citizen of the United States, residing at Hampton, in the county of Elizabeth City and State of Virginia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fertilizer-distributers; and the object of the invention is to produce a simple and efficient apparatus of this nature in which the feeding-spouts may be conveniently actuated from a location adjacent to the seat upon which the operator sits for the purpose of adjusting the exit ends of the feed-spouts to drop the fertilizer in rows of different widths.

The invention consists, further, in various details of construction and in combinations of parts, which will be hereinafter fully described and then specifically defined in the appended claims.

My invention is illustrated in the accompanying drawings, in which—

Figure 1:
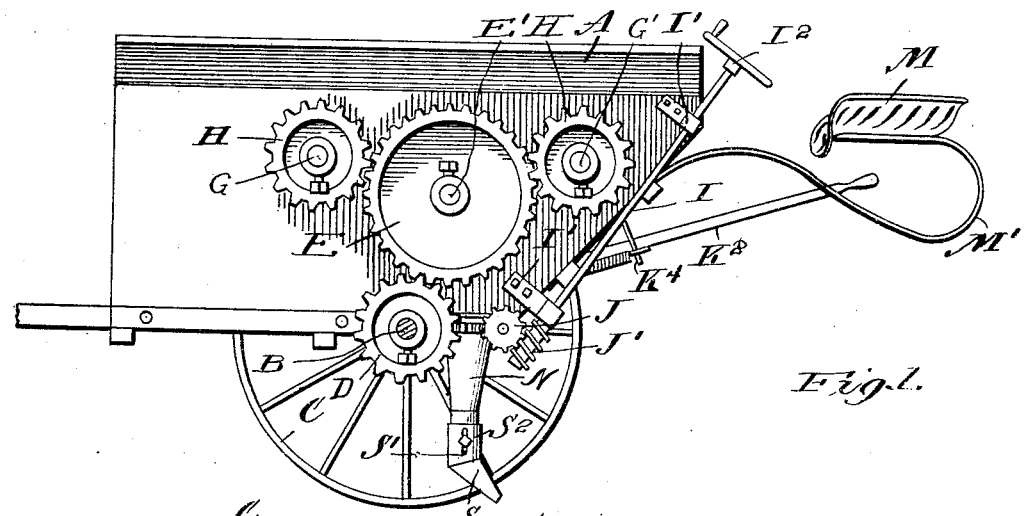
Figure 2:
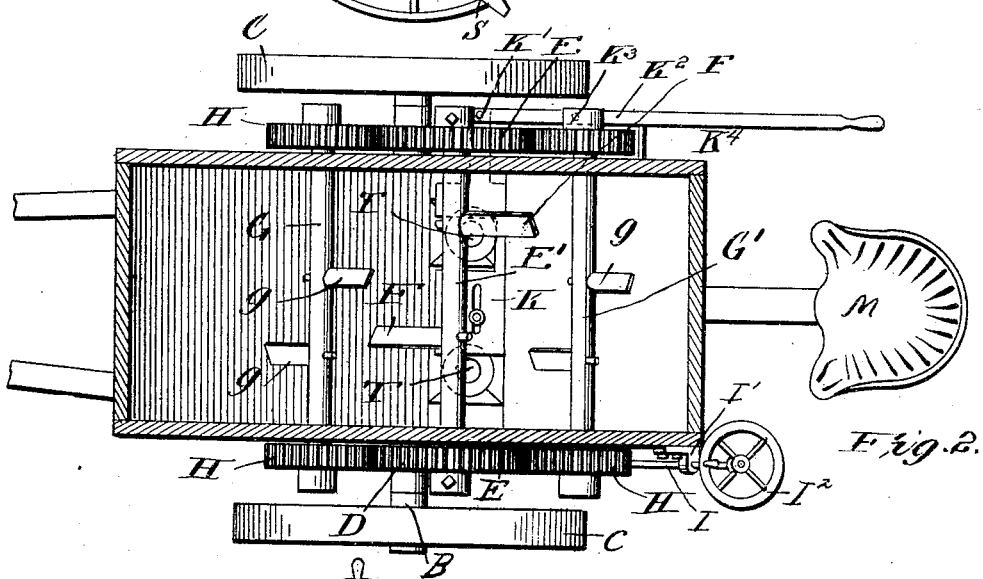

Figure 1 is a side elevation of my improved fertilizing apparatus. Fig. 2 is a top plan view, and Fig. 3 is a rear end view.

Reference now being had to the details of the drawings by letter, A designates a box of a fertilizer-distributer, which is mounted upon an axle B, and driving-wheels C are fixed to rotate with said shaft, whereby power may be transmitted to the stirrers within the box. Gear-wheels D are fixed to said shaft or axle and mesh with gear-wheels E, which are fixed to a shaft E', journaled in the side walls of the box. Said shaft E' is provided with stirrer-fingers F, which are adapted to actuate and mix up the fertilizer within the box preparatory to its being fed therefrom.

G and G' designate two shafts journaled in the walls of the box, and each is provided with stirrer-arms $g$. Fixed to the ends of the shafts G and G' are the gear-wheels H, which are in mesh with the wheels E, which drive the same. The lowest portion of the bottom of said box has exit-openings T, regulated by means of a slide K, the end of which is pivotally connected at K' to a lever $K^2$, which in turn is pivoted at $K^3$ upon a bracket on the side of the frame. A flexible rack-bar $K^4$ is fastened to the fertilizer-box and is adapted to be engaged by the lever $K^2$ to hold the same in different positions, accordingly as it may be desired to regulate the feed of fertilizer from the apparatus.

Figure 3:
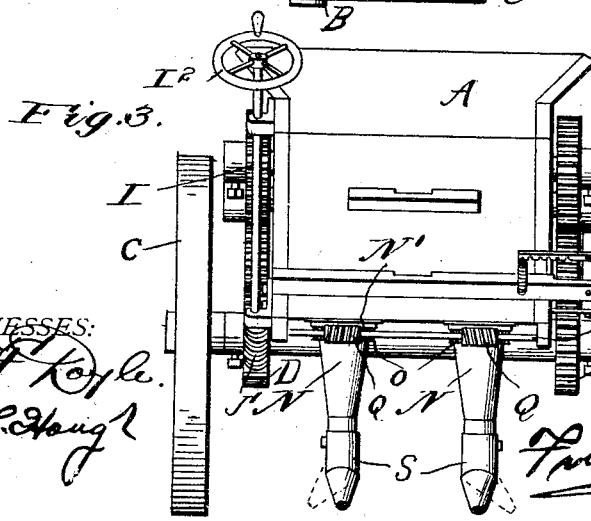

Referring to Fig. 3 of the drawings, the exit feed-pipes N will be observed, said pipes being swiveled at their upper ends to a collar N', fitted over the exit-openings in the bottom of the box, and about the circumference of each pipe N, near its upper end, is a worm-gear O, which is in mesh with a worm Q, fixed to the shaft R, journaled in suitable bearings in the frame of the apparatus. At one end of the shaft R is a worm-wheel J, (shown in Fig. 1 of the drawings,) which is in mesh with a worm-wheel J' on the shaft I, which is journaled in the bearings I' upon one side of the box. The upper end of the shaft I carries a hand-wheel $I^2$, which is positioned convenient to the seat M, which is mounted upon the spring M', held upon the rear inclined end of the box.

The lower portion of each feeding-spout N has an angled nozzle S, the shank portion of which has an elongated slot S', through which a thumb-screw $S^2$ passes, carried by the pipe N, by which the nozzle may be held in an adjusted position, as may be desired.

The operation of my improved apparatus is as follows: When it is desired to swing the nozzle ends of the pipes toward each other or in the opposite direction in order to drop the fertilizer in rows of different widths, the operator by turning the hand-wheel $I^2$ will cause the shaft R to rotate, and the worm-wheels upon said shaft meshing with the worm-wheels upon the pipes N will cause the same to turn in one direction or the other, it being observed that said worm-wheels are one a right and the other left threaded. When it is desired to cause the nozzles to be held near the ground, they may be easily adjusted by the mechanism shown.

While I have shown a particular construction of apparatus embodying my invention, it will be understood that I may vary the details of the same, if desired, without in any way departing from the spirit of the invention.

Having thus fully described my invention, what I claim as new, and desire to secure by Letters Patent, is—

1. A fertilizer-distributer comprising a box, a driving-axle, wheels turning therewith, stirrer-shafts having gear connection with said axle, exit feed-pipes swiveled to the under side of the box, worm-teeth about the circumference of said pipes, worm-wheels mounted upon a suitable shaft and in mesh with the worm-teeth upon said pipes, means for rotating said worm-wheels, and angled nozzles mounted upon said pipes, as set forth.

2. A fertilizer-distributer comprising a box, a driving-axle, wheels turning therewith, stirrer-shafts having gear connection with said axle, exit feed-pipes swiveled to the under side of the box, worm-teeth about the circumference of said pipes, worm-wheels mounted upon a suitable shaft and in mesh with the worm-teeth upon said pipes, angled nozzles adjustably held upon said pipes, an operating-wheel, a shaft carrying the same mounted in suitable bearings and having gear connection with the worm-wheel-carrying shaft, as set forth.

In testimony whereof I hereunto affix my signature in presence of two witnesses.

NEAL AVERY BUTLER.

Witnesses:
    FRANKLIN H. HOUGH,
    A. L. HOUGH.